United States Patent [19]
Calvachio, Jr.

[11] Patent Number: 5,544,434
[45] Date of Patent: Aug. 13, 1996

[54] AIR FLOW DEFLECTOR FOR A SNOW PLOW

[76] Inventor: John J. Calvachio, Jr., Harvard Dr., R.F.D. #7, Carmel, N.Y. 10512

[21] Appl. No.: 282,926

[22] Filed: Jul. 29, 1994

[51] Int. Cl.⁶ .............................. E01H 5/00; B60K 11/00
[52] U.S. Cl. .......................... 37/266; 37/241; 296/180.1
[58] Field of Search ........................... 37/221, 233, 241, 37/266, 273, 283; 172/767, 801; 180/54 A; 296/180.1

[56] References Cited

U.S. PATENT DOCUMENTS

| | | | |
|---|---|---|---|
| 2,715,786 | 8/1955 | Dorko | 37/283 |
| 3,088,230 | 5/1963 | Bonic | 37/266 |
| 3,432,947 | 3/1969 | Peitl | 37/266 |
| 3,827,521 | 8/1974 | Welsh | 180/54 A |
| 3,828,879 | 8/1974 | Harkey et al. | 180/54 A |
| 4,024,922 | 5/1977 | Ronald | 172/801 |
| 4,587,750 | 5/1986 | Larson | 37/266 X |
| 4,896,915 | 1/1990 | Morandi et al. | 37/241 X |

Primary Examiner—Terry Lee Melius
Assistant Examiner—Robert Pezzuto
Attorney, Agent, or Firm—Bauer & Schaffer

[57] ABSTRACT

An air flow deflector for a snow plow mounted on a motor vehicle having a radiator. The air flow deflector includes a deflector fin for deflecting air flow against the radiator of the motor vehicle. The deflector fin includes a main body having an upper surface, a lower surface and opposite side surfaces. A mounting arrangement is provided for mounting the deflector fin in adjustable angular relation to a top surface of the snow plow and in spaced relation to the top surface of the snow plow so as to define an air flow passage therebetween. An arrangement is also provided for releasably fixing the orientation of the deflector fin with respect to the mounting arrangement.

8 Claims, 2 Drawing Sheets

AIR FLOW DEFLECTOR FOR A SNOW PLOW

FIELD OF THE INVENTION

The present invention relates generally to air flow deflectors for motor vehicles and, more particularly, to an air flow deflector mounted to a snow plow blade supported by a motor vehicle to direct air flow towards the vehicle radiator.

BACKGROUND OF THE INVENTION

Snow plow blades are mounted on the front of motor vehicles, such as a truck or jeep, for conducting snow plowing operations. A particular problem with front mounted plow blades is that when the plow blade is in a non-plowing position, the snow plow blade is typically aligned in front of the vehicle, blocking air flow to the vehicle radiator. As a result, this blockage of air causes the engine of the vehicle to overheat, forcing the driver to stop a plowing operation until the engine cools off. In addition, overheating of the motor vehicle can result in damage to internal components of the vehicle engine.

Numerous prior art air flow deflectors have been provided which are adapted to reduce the drag of air flowing against frontal surfaces of vehicle carrying a snow plow blade. However, these deflectors are ineffective in providing sufficient air flow to the vehicle's engine, are complex in construction, difficult to use and expensive in cost to manufacture.

SUMMARY OF THE INVENTION

A primary object of the present invention is to provide an air flow deflector for a snow plow on a motor vehicle that will overcome the shortcomings of the prior art deflectors.

Another object of the present invention is to provide an air flow deflector for a snow plow on a motor vehicle that is mounted directly to a top surface of the snow plow blade to deflect sufficient air flow to the motor vehicle's radiator.

A further object of the present invention is to provide an air flow deflector for a snow plow on a motor vehicle which is simple in construction, easy to use and economical in cost to manufacture.

Briefly stated, the present invention comprises an air flow deflector for a snow plow mounted on a motor vehicle having a radiator. The air flow deflector comprises a deflector fin for deflecting air flow against the radiator of the motor vehicle. The deflector fin includes a main body having an upper surface, a lower surface and opposite side surfaces. Means is provided for mounting the deflector fin in adjustable angular relation to a top surface of the snow plow and in spaced relation to the top surface of the snow plow so as to define an air flow passage therebetween. Means is also provided for releasably fixing the orientation of the deflector fin with respect to the mounting means.

BRIEF DESCRIPTION OF THE DRAWINGS

The foregoing summary, as well as the following detailed description, will be better understood when read in conjunction with the appended drawings. For the purpose of illustrating the invention, there is shown an embodiment which is presently preferred, it being understood, however, that this invention is not limited to the precise arrangement and instrumentalities shown. In the drawings.

DETAILED DESCRIPTION OF THE PREFERRED EMBODIMENT

While this invention is susceptible of embodiments in many different forms, this specification and the accompanying drawings disclose only some specific forms as examples of the use of the invention. The invention is not intended to be limited to the embodiment so described, and the scope of the invention will be pointed out in the appended claims.

Figure 1:
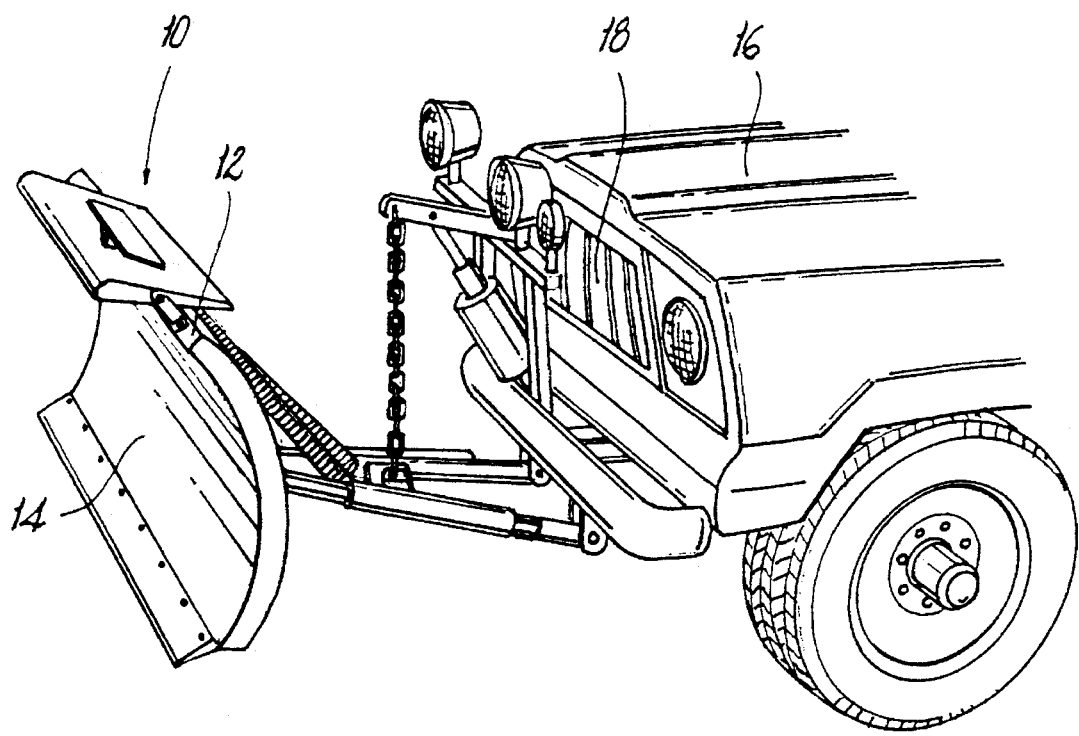
FIG. 1 is a perspective view of the front end of a motor vehicle with an air flow deflector in accordance to the present invention attached to a conventional snow plow mounted on a vehicle.

Referring to the drawings in detail, wherein like numerals indicate like elements throughout, there is shown in FIG. 1 an air flow deflector, generally designated 10, mounted on a top portion 12 of a snow plow blade 14 mounted to the front end of a motor vehicle 16. The motor vehicle 16 is a conventional vehicle, such as a truck or a jeep, including a radiator 18. As described below, the air flow deflector 10 operates to deflect a sufficient amount of air to the radiator 18 to prevent overheating of the vehicle 18.

Figure 2:
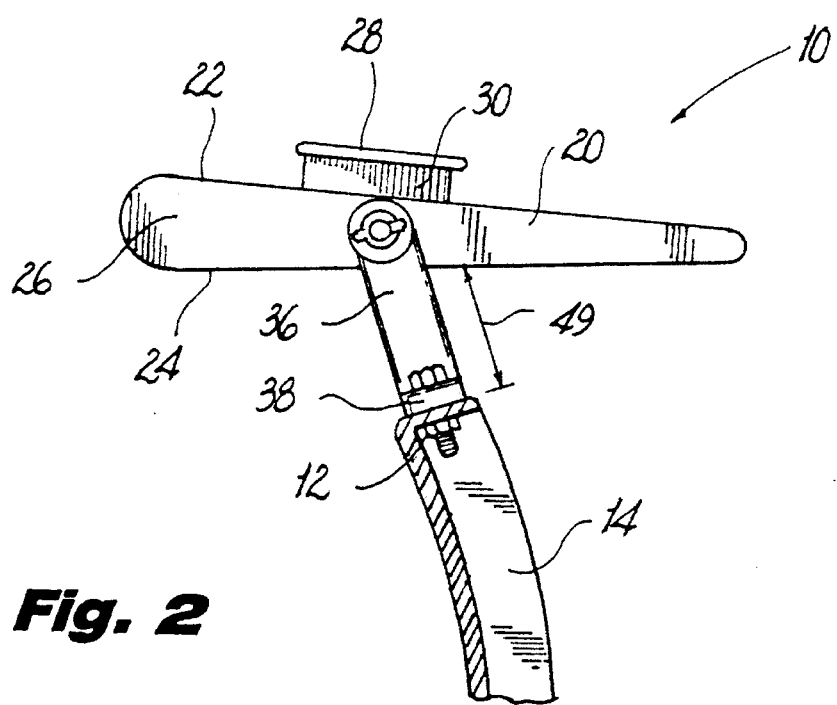
FIG. 2 is a side elevation of the air flow deflector in accordance to the present invention.
Figure 3:
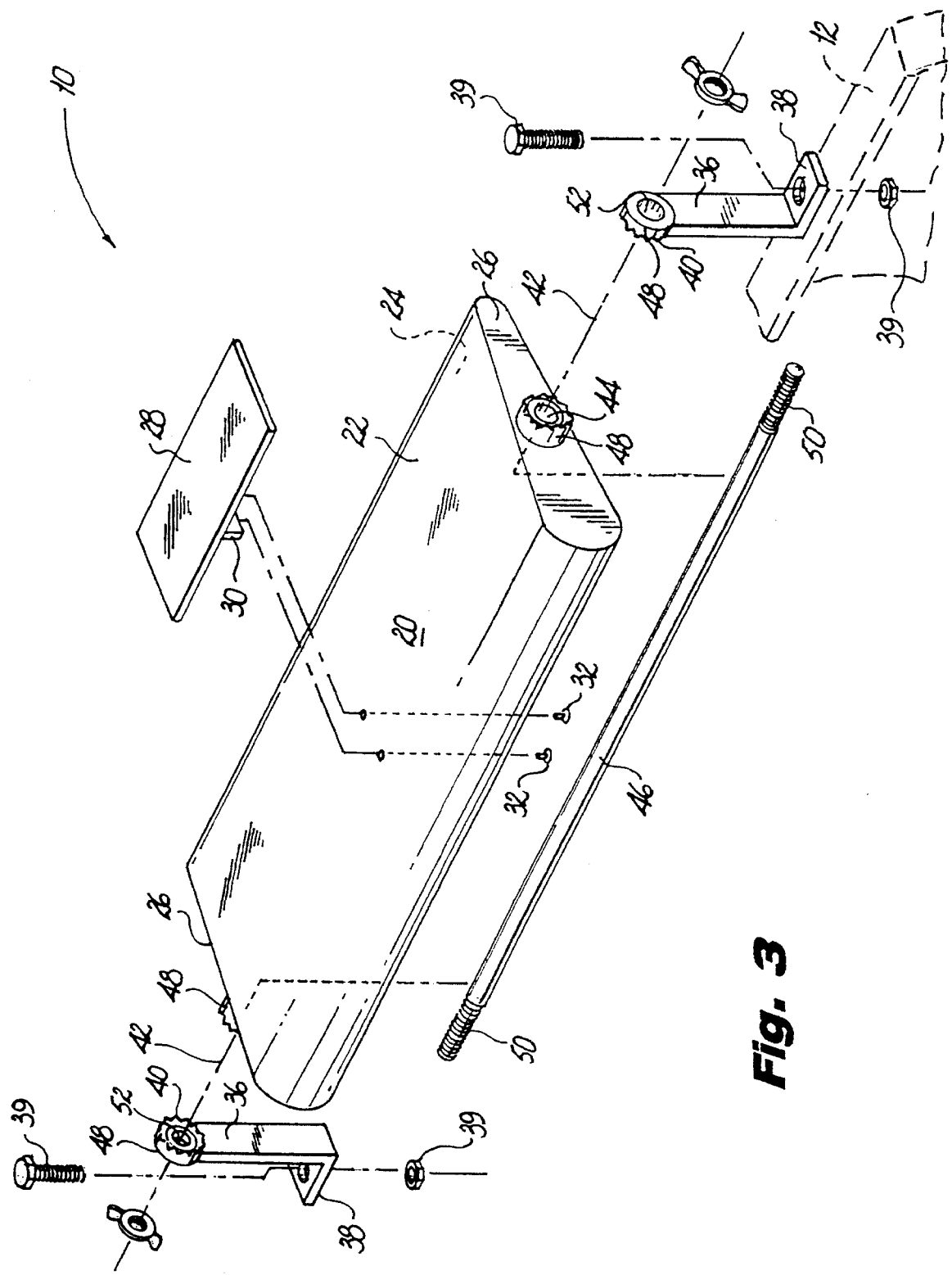
FIG. 3 is an exploded perspective view of an air flow deflector in accordance to the present invention.

As best shown in FIGS. 2 and 3, the air flow deflector 10 comprises a first deflector fin 20 including a wedge-shaped main body having an upper surface 22, a lower surface 24 and opposite side surfaces 26. A second deflector fin 28 also wedge-shaped is fixedly mounted to the upper surface 22 of the first deflector fin 20. The air flow deflector 10 also comprises means for mounting the first deflector fin 20 in adjustable angular relation to the top surface 12 of the snow plow blade 14 and means for fixing the orientation of the first deflector fin with respect to the mounting means as further described below.

In the present embodiment, the first and second deflector fins 20, 28, are formed of a high strength light weight material, such as steel, aluminum, or a high strength polymer. However, it is understood by those skilled in the art that other materials and fabrication methods for the deflector fins are suitable. For example, the deflector fins could be injection molded from a suitable polymeric material, such as a hard plastic, and could be of solid or hollow construction. Further, in the present embodiment, the surfaces of the deflector fins are planar in cross-section. However, the surfaces of the deflector fins could be constructed with a curved cross-section without departing from the spirit and scope of the invention.

The second deflector fin 28 includes a bridge portion 30 extending downwardly from a lower surface thereof. The bridge portion 30 mounts the second deflector fin 28 to a center section of the upper surface 22 of the first deflector fin 20. Standard off-the-shelf hardware, such as bolts 32, extend through openings 34 extending from the upper surface 22 to the lower surface 24 of the first deflector fin 20 and engage the bridge portion 30 on the second deflector fin 28. When the air flow deflector 10 is in position, the first deflector fin 20 will deflect air into the radiator 18 of the vehicle 16 to prevent overheating and the second deflector fin 28 will increase the amount of deflected air into the radiator.

According to the present embodiment, the means for mounting the first deflector fin 20 in adjustable angular relation to the top surface 12 of the plow blade 14 comprises a pair of support arms 36. Each support arm 36 includes a first end 38 secured to the top surface 12 of the plow blade 14 using standard off-the-shelf hardware 39 and a second end 40 pivotally mounted about an axis 42 to the side surfaces 26 of the first deflector fin 20.

In the present embodiment shown in FIG. 3, the means for releasably fixing the orientation of the first deflector fin 20 with respect to the plow blade 14 comprises an aperture 44 extending through the main body of the first deflector fin 20 and through the opposite side surfaces 26, bolt means 46 extending through the aperture and rachet means 48a for releasably fixing the first deflector fin in a selected orientation with respect to the support arms 36 on which is located a corresponding annular rachet 48b. The support 36 is of such a length that the annular rachet 48b is positioned so that in the assembled condition of the air flow deflector 10 to the top surface 12 of the plow blade 14 shown in FIG. 2, the lower surface 24 of the first deflector fin 20 is spaced from the top surface 12 by a distance indicated by arrow 49 (FIG. 2) defining an air flow passage.

The bolt means 46 is preferably a rod extending through the main body of the first deflector fin 20 and includes opposite threaded ends 50 extending through the apertures 44 on each side surface 26. The rachet means 48 comprises a first circular row of teeth secured to each side surface 26 of the first deflector fin 26 and surrounding a respective one of the apertures 44, and a second circular row of teeth secured to the second end 40 of each support arm 36 and surrounding the respective center opening 52 through each second end thereof.

The air flow deflector 10 is assembled in place on the vehicle simply by arranging the first deflector fin 20 between the opposing supports 36 with the apertures 44 in alignment with the center 52 of the annular racket 48b. Thereafter, the rod 46 is inserted through the annular ratchets 48b and the ratchet 48a of first deflector fin.

When the air flow deflector 10 is in this position, the threaded ends 50 of the rod 46 extend respectively through each opening 52 in the support arm 36 and the first and second circular row of teeth are in meshing engagement to position the first deflector fin 20 in a selected angular orientation with respect to the plow blade 14. A wing nut 54 is threaded to each threaded end 50 of the bolt 46 compressing the supports 36 toward each other so that the ratchet members on each side of the first deflector intermesh, thus fixedly positioning and locking the first deflector fin 20 in the selected orientation.

It may be desirable to fix the rod 26 within the first deflector 20. This can be accomplished by bolting or welding the rod to the inner frame of the deflector 20. In an alternative construction, the ratchet assemblies 48a at the ends of the deflector 20 can be integrally formed with central threaded stub rods which will enter the support ratchets 40b. Thus, each end of the deflector is built with means for securing the rod in place and a long bolt avoided.

During operation, the selected angular orientation of the first deflector fin 20 forces air through the air flow passage between the lower surface 24 of the first deflector fin, indicated by arrow 49 in FIG. 2, down through the radiator 18 in the front of the vehicle 16 (FIG. 4). The second deflector fin 28 increases the amount of air deflected to the radiator 18. Thus, the air flow deflector 10, when mounted on the plow blade 14, assures a continuous flow of air to the radiator 18 while the vehicle 16 is moving preventing overheating of the vehicle.

From the foregoing, it will be appreciated that the air flow deflector of the present invention is simple in construction, economical to manufacture, easily mounted on or removed from any conventional snow plow blade and does not interfere with the operation of the snow plow blade during a plowing operation.

It will be appreciated by those skilled in the art that changes could be made to the embodiment described above without departing from the broad inventive concept thereof. It is understood, therefore, that this invention is not limited to the particular embodiment disclosed, but is intended to cover modifications within the spirit and scope of the present invention as defined by the appended claims.

What is claimed is:

1. An air flow deflector for a snow plow mounted on a motor vehicle having a radiator, said air flow deflector comprising: a wedge-shaped deflector fin for deflecting air flow against the radiator, said deflector fin including a main body having rounded leading and trailing edges, an upper surface, a lower surface spaced from the upper surface and opposite side surfaces connecting said upper and lower surfaces, said leading edge providing a wind deflecting surface; means for mounting said deflector fin to a top surface of said snow plow in spaced relation thereto so as to define an air flow passage between the plow and bottom surface of said deflector fin; and means for mounting said deflector fin for rotation about an axis parallel to the top surface of said snow plow and for releasably fixing the angular orientation of said deflector fin with respect to said mounting means.

2. The air flow deflector according to claim 1, wherein said mounting means comprises a pair of support arms, each of said support arms having a first end secured to the top surface of the snow plow and a second end pivotally mounted about an axis to the side surfaces of said deflector fin.

3. The air flow deflector according to claim 2, wherein said fixing means comprises: an aperture located within said first end of each support arm, said pivot axis extending through the center of said aperture; bolt means extending outwardly from each side surface of said deflector fin and through said aperture of each respective support arm; and ratchet means for releasably fixing said deflector fin in a selected orientation with respect to said snow plow.

4. The air flow deflector according to claim 3, wherein said bolt means comprises a rod extending through said main body of said deflector fin and including opposite ends extending outwardly from said side surfaces of said deflector fin; and wherein said ratchet means comprises: a first circular row of teeth secured to each of said side surface of said deflector fin and surrounding a respective end of said rod; and a second circular row of teeth secured to the first end of each support bracket and surrounding said aperture, wherein said first circular row of teeth is in meshing engagement with said second circular row of teeth for releasably fixing said deflector fin in a selected orientation with respect to said snow plow.

5. An air flow deflector for a snow plow mounted on a motor vehicle having a radiator to extend substantially transverse to the movement of the motor vehicle, said air flow deflector comprising: a first wedge-shaped deflector fin for deflecting air flow against the radiator, said first deflector fin including a main body having rounded leading and trailing edges, an upper surface, a lower surface and opposite side surfaces connecting said upper and lower surfaces, said leading edge providing a wind deflecting surface; a second wedge-shaped deflector fin for deflecting increased air flow against the radiator, said second deflector fin having upper and lower surfaces and being fixedly mounted to the upper surface of said first deflector fin to define a space therebetween and to extend generally parallel to said first deflector fin; means for mounting said first deflector fin on said snow plow and in spaced relation to the upper edge of said snow plow so as to define an air flow passage therebetween; and means for releasably fixing the angular orientation of said first deflector fin about a horizontal axis with respect to said snow plow.

6. The air flow deflector according to claim 5, wherein said mounting means comprises a pair of support arms, each of said support arms having a first end secured to the top surface of the snow plow and a second end pivotally mounted about an axis to the side surfaces of said first deflector fin.

7. The air flow deflector according to claim 6, wherein said fixing means comprises: an aperture extending through said main body and through the opposite side surfaces of said first deflector fin, said pivot axis extending through the center of said aperture; bolt means extending through said aperture; and ratchet means for releasably fixing said first deflector fin in a selected orientation with respect to said support arms.

8. The air flow deflector according to claim 7, wherein said bolt means comprises a rod extending through said main body of said first deflector fin and including opposite ends extending outwardly from said side surfaces of said first deflector fin; and wherein said ratchet means comprises: a first circular row of teeth secured to each of said side surface of said first deflector fin and surrounding a respective end of said rod; and a second circular row of teeth secured to the first end of each support bracket and surrounding said aperture, wherein said first circular row of teeth is in meshing engagement with said second circular row of teeth for releasably fixing said first deflector fin in a selected orientation with respect to said snow plow.

\* \* \* \* \*